US010572928B2

(12) United States Patent
Costa et al.

(10) Patent No.: US 10,572,928 B2
(45) Date of Patent: *Feb. 25, 2020

(54) METHOD AND SYSTEM FOR RECOMMENDING PRODUCTS BASED ON A RANKING COCKTAIL

(71) Applicant: Fredhopper B.V., Amsterdam (NL)

(72) Inventors: David Costa, Amsterdam (NL); Andreas Kohn, Rostock (DE); Pavel Penchev, Sofia (BG); Erica Bellis, Amsterdam (NL); Adrien Coutarel, Vanves (FR)

(73) Assignee: Fredhopper B.V., Amsterdam (NL)

( * ) Notice: Subject to any disclaimer, the term of this patent is extended or adjusted under 35 U.S.C. 154(b) by 324 days.

This patent is subject to a terminal disclaimer.

(21) Appl. No.: 15/672,290

(22) Filed: Aug. 8, 2017

(65) Prior Publication Data

US 2017/0337614 A1 Nov. 23, 2017

Related U.S. Application Data

(63) Continuation of application No. 13/891,029, filed on May 9, 2013, now Pat. No. 9,773,270.
(Continued)

(51) Int. Cl.
*G06Q 30/00* (2012.01)
*G06Q 30/06* (2012.01)
(52) U.S. Cl.
CPC .............. *G06Q 30/0631* (2013.01)
(58) Field of Classification Search
CPC .................................. G06Q 30/0631
See application file for complete search history.

(56) References Cited

U.S. PATENT DOCUMENTS

| 4,845,658 A | 7/1989 | Gifford |
| 4,916,614 A | 4/1990 | Kaji |

(Continued)

FOREIGN PATENT DOCUMENTS

| AU | 5240198 A | 5/1998 |
| AU | 694367 B2 | 7/1998 |

(Continued)

OTHER PUBLICATIONS

Padmanabhan, Venkata N., and Jeffrey C. Mogul. "Using predictive prefetching to improve world wide web latency." ACM SIGCOMM Computer Communication Review 26.3 (1996): 22-36. (Year: 1996).*

(Continued)

*Primary Examiner* — Matthew E Zimmerman
(74) *Attorney, Agent, or Firm* — Carr & Ferrell LLP

(57) ABSTRACT

Systems and methods for e-commerce personalization and merchandising are provided herein. In some instances, methods may include determining triggers for a consumer, where the triggers being associated with objective consumer preferences and subjective consumer preferences for the consumer. Also, the method includes selecting a ranking cocktail for the consumer that includes a plurality of attributes that each includes a weight. The method also includes utilizing the ranking cocktail to select recommended products from an inventory of products in a database of a merchant, and providing the recommended products for display to the consumer.

18 Claims, 6 Drawing Sheets

Related U.S. Application Data

(60) Provisional application No. 61/646,187, filed on May 11, 2012.

(56) References Cited

U.S. PATENT DOCUMENTS

| | | | |
|---|---|---|---|
| 4,920,499 A | 4/1990 | Skeirik | |
| 5,075,850 A | 12/1991 | Asahioka et al. | |
| 5,295,068 A | 3/1994 | Nishino et al. | |
| 5,351,189 A | 9/1994 | Doi | |
| 5,418,717 A | 5/1995 | Su et al. | |
| 5,477,451 A | 12/1995 | Brown et al. | |
| 5,497,319 A | 3/1996 | Chong et al. | |
| 5,640,575 A | 6/1997 | Maruyama | |
| 5,644,775 A | 7/1997 | Thompson et al. | |
| 5,675,802 A | 10/1997 | Allen et al. | |
| 5,708,780 A | 1/1998 | Levergood et al. | |
| 5,715,314 A | 2/1998 | Payne et al. | |
| 5,724,424 A | 3/1998 | Gifford | |
| 5,751,957 A | 5/1998 | Hiroya et al. | |
| 5,774,868 A | 6/1998 | Cragun et al. | |
| 5,812,776 A | 9/1998 | Gifford | |
| 5,813,007 A | 9/1998 | Nielsen | |
| 5,873,056 A | 2/1999 | Liddy | |
| 5,884,097 A | 3/1999 | Li et al. | |
| 5,884,246 A | 3/1999 | Boucher et al. | |
| 5,894,554 A | 4/1999 | Lowery et al. | |
| 5,895,446 A | 4/1999 | Takeda et al. | |
| 5,909,492 A | 6/1999 | Payne et al. | |
| 5,966,685 A | 10/1999 | Flanagan et al. | |
| 5,974,372 A | 10/1999 | Barnes | |
| 5,978,828 A | 11/1999 | Greer et al. | |
| 5,987,401 A | 11/1999 | Trudeau | |
| 5,987,402 A | 11/1999 | Murata et al. | |
| 6,026,413 A | 2/2000 | Challenger et al. | |
| 6,041,333 A | 3/2000 | Bretschneider et al. | |
| 6,041,360 A | 3/2000 | Himmel et al. | |
| 6,044,344 A | 3/2000 | Kanevsky | |
| 6,049,785 A | 4/2000 | Gifford | |
| 6,085,162 A | 7/2000 | Cherny | |
| 6,092,035 A | 7/2000 | Kurachi et al. | |
| 6,108,703 A | 8/2000 | Leighton et al. | |
| 6,122,666 A | 9/2000 | Beurket et al. | |
| 6,128,652 A | 10/2000 | Toh et al. | |
| 6,128,655 A | 10/2000 | Fields et al. | |
| 6,161,082 A | 12/2000 | Goldberg et al. | |
| 6,163,785 A | 12/2000 | Carbonell et al. | |
| 6,195,649 B1 | 2/2001 | Gifford | |
| 6,199,051 B1 | 3/2001 | Gifford | |
| 6,205,437 B1 | 3/2001 | Gifford | |
| 6,212,634 B1 | 4/2001 | Geer et al. | |
| 6,216,212 B1 | 4/2001 | Challenger et al. | |
| 6,219,818 B1 | 4/2001 | Freivald et al. | |
| 6,256,712 B1 | 7/2001 | Challenger et al. | |
| 6,263,332 B1 | 7/2001 | Nasr et al. | |
| 6,278,969 B1 | 8/2001 | King et al. | |
| 6,279,112 B1 | 8/2001 | O'toole, Jr. et al. | |
| 6,330,566 B1 | 12/2001 | Durham | |
| 6,330,598 B1 | 12/2001 | Beckwith et al. | |
| 6,338,033 B1 | 1/2002 | Bourbonnais et al. | |
| 6,347,316 B1 | 2/2002 | Redpath | |
| 6,356,865 B1 | 3/2002 | Franz et al. | |
| 6,356,903 B1 | 3/2002 | Baxter et al. | |
| 6,363,337 B1 | 3/2002 | Amith | |
| 6,401,105 B1 | 6/2002 | Carlin et al. | |
| 6,415,257 B1 | 7/2002 | Junqua | |
| 6,438,540 B2 | 8/2002 | Nasr et al. | |
| 6,449,599 B1 | 9/2002 | Payne et al. | |
| 6,477,524 B1 | 11/2002 | Taskiran | |
| 6,477,575 B1 | 11/2002 | Koeppel et al. | |
| 6,490,358 B1 | 12/2002 | Geer et al. | |
| 6,490,563 B2 | 12/2002 | Hon | |
| 6,526,426 B1 | 2/2003 | Lakritz | |
| 6,581,061 B2 | 6/2003 | Graham | |
| 6,623,529 B1 | 9/2003 | Lakritz | |
| 6,658,627 B1 | 12/2003 | Gallup | |
| 6,725,333 B1 | 4/2004 | Degenaro et al. | |
| 6,748,569 B1 | 6/2004 | Brooke et al. | |
| 6,782,384 B2 | 8/2004 | Sloan et al. | |
| 6,865,528 B1 | 3/2005 | Huang | |
| 6,920,419 B2 | 7/2005 | Kitamura | |
| 6,973,656 B1 | 12/2005 | Huynh et al. | |
| 6,976,207 B1 | 12/2005 | Rujan | |
| 6,990,439 B2 | 1/2006 | Xun | |
| 7,013,264 B2 | 3/2006 | Dolan | |
| 7,031,908 B1 | 4/2006 | Huang | |
| 7,050,964 B2 | 5/2006 | Menzes | |
| 7,089,493 B2 | 8/2006 | Hatori et al. | |
| 7,111,229 B2 | 9/2006 | Nicholas et al. | |
| 7,124,092 B2 | 10/2006 | O'toole, Jr. et al. | |
| 7,177,792 B2 | 2/2007 | Knight | |
| 7,191,447 B1 | 3/2007 | Ellis et al. | |
| 7,207,005 B2 | 4/2007 | Laktritz | |
| 7,209,875 B2 | 4/2007 | Quirk | |
| 7,249,013 B2 | 7/2007 | Al-Onaizan | |
| 7,249,314 B2 | 7/2007 | Walker et al. | |
| 7,272,639 B1 | 9/2007 | Levergood et al. | |
| 7,295,962 B2 | 11/2007 | Marcu | |
| 7,295,963 B2 | 11/2007 | Richardson et al. | |
| 7,302,429 B1 * | 11/2007 | Wanker | G06Q 30/02 |
| 7,333,927 B2 | 2/2008 | Lee | |
| 7,340,388 B2 | 3/2008 | Soricut | |
| 7,353,165 B2 | 4/2008 | Zhou | |
| 7,369,984 B2 | 5/2008 | Fairweather | |
| 7,383,320 B1 | 6/2008 | Silberstein et al. | |
| 7,389,222 B1 | 6/2008 | Langmead | |
| 7,389,223 B2 | 6/2008 | Atkin | |
| 7,448,040 B2 | 11/2008 | Ellis et al. | |
| 7,454,326 B2 | 11/2008 | Marcu | |
| 7,509,313 B2 | 3/2009 | Colledge | |
| 7,516,062 B2 | 4/2009 | Chen et al. | |
| 7,533,013 B2 | 5/2009 | Marcu | |
| 7,606,814 B2 | 10/2009 | Deily et al. | |
| 7,620,538 B2 | 11/2009 | Marcu | |
| 7,620,549 B2 | 11/2009 | Di Cristo | |
| 7,624,005 B2 | 11/2009 | Koehn | |
| 7,668,782 B1 | 2/2010 | Reistad et al. | |
| 7,680,647 B2 | 3/2010 | Moore | |
| 7,698,126 B2 | 4/2010 | Kohlmeier et al. | |
| 7,716,037 B2 | 5/2010 | Precoda | |
| 7,734,459 B2 | 6/2010 | Menezes | |
| 7,739,102 B2 | 6/2010 | Bender | |
| 7,739,286 B2 | 6/2010 | Sethy | |
| 7,788,087 B2 | 8/2010 | Corston-Oliver | |
| 7,813,918 B2 | 10/2010 | Muslea | |
| 7,836,057 B1 | 11/2010 | Micaelian et al. | |
| 7,865,358 B2 | 1/2011 | Green | |
| 7,904,595 B2 | 3/2011 | Cheng | |
| 7,925,493 B2 | 4/2011 | Watanabe | |
| 7,945,437 B2 | 5/2011 | Mount et al. | |
| 7,949,633 B1 | 5/2011 | Shaver et al. | |
| 7,958,453 B1 | 6/2011 | Taing | |
| 7,983,896 B2 | 7/2011 | Ross | |
| 7,983,897 B2 | 7/2011 | Chin | |
| 8,015,222 B2 | 9/2011 | Abnous et al. | |
| 8,078,450 B2 | 12/2011 | Anisimovich et al. | |
| 8,135,575 B1 | 3/2012 | Dean | |
| 8,185,830 B2 | 5/2012 | Saha et al. | |
| 8,195,447 B2 | 6/2012 | Anismovich | |
| 8,214,196 B2 | 7/2012 | Yamada | |
| 8,239,186 B2 | 8/2012 | Chin | |
| 8,239,207 B2 | 8/2012 | Seligman | |
| 8,260,846 B2 | 9/2012 | Lahav | |
| 8,286,185 B2 | 10/2012 | Ellis et al. | |
| 8,296,127 B2 | 10/2012 | Marcu | |
| 8,296,463 B2 | 10/2012 | Cheng et al. | |
| 8,346,585 B1 | 1/2013 | Griffith et al. | |
| 8,352,244 B2 | 1/2013 | Gao et al. | |
| 8,364,463 B2 | 1/2013 | Miyamoto | |
| 8,386,234 B2 | 2/2013 | Uchimoto et al. | |
| 8,413,045 B2 | 4/2013 | Lemonik et al. | |
| 8,423,346 B2 | 4/2013 | Seo et al. | |
| 8,442,812 B2 | 5/2013 | Ehsani | |
| 8,453,052 B1 | 5/2013 | Newman et al. | |
| 8,489,980 B2 | 7/2013 | Lakritz | |

(56) References Cited

U.S. PATENT DOCUMENTS

| | | |
|---|---|---|
| 8,521,506 B2 | 8/2013 | Lancaster et al. |
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,635,327 B1 | 1/2014 | Levergood et al. |
| 8,635,539 B2 | 1/2014 | Young |
| 8,666,725 B2 | 3/2014 | Och |
| 8,671,214 B2 | 3/2014 | Lockhart et al. |
| 8,683,329 B2 | 3/2014 | Tang et al. |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,799,200 B2 | 8/2014 | Lahav |
| 8,818,790 B2 | 8/2014 | He et al. |
| 8,843,359 B2 | 9/2014 | Lauder |
| 8,862,456 B2 | 10/2014 | Krack et al. |
| 8,898,052 B2 | 11/2014 | Waibel |
| 8,903,707 B2 | 12/2014 | Zhao |
| 8,909,683 B1 | 12/2014 | Ledet |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,954,539 B2 | 2/2015 | Lahav |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,317,622 B1 | 4/2016 | Zuromski et al. |
| 9,336,487 B2 | 5/2016 | Lahav |
| 9,369,489 B2 | 6/2016 | Kato |
| 9,396,184 B2 | 7/2016 | Roy |
| 9,396,436 B2 | 7/2016 | Lahav |
| 9,430,449 B2 | 8/2016 | Leblond et al. |
| 9,465,797 B2 | 10/2016 | Ji |
| 9,471,563 B2 | 10/2016 | Trese |
| 9,519,640 B2 | 12/2016 | Perez |
| 9,547,626 B2 | 1/2017 | de Voogd |
| 9,552,355 B2 | 1/2017 | Dymetman |
| 9,596,188 B2 | 3/2017 | Cheng et al. |
| 9,600,473 B2 | 3/2017 | Leydon |
| 9,613,026 B2 | 4/2017 | Hodson |
| 9,773,270 B2 | 9/2017 | Costa et al. |
| 9,781,050 B2 | 10/2017 | Cheng et al. |
| 9,954,794 B2 | 4/2018 | Cheng et al. |
| 10,025,776 B1 | 7/2018 | Sjoberg et al. |
| 10,061,749 B2 | 8/2018 | Homer et al. |
| 10,452,740 B2 | 10/2019 | Leblond et al. |
| 2001/0029507 A1 | 10/2001 | Nojima |
| 2002/0007383 A1 | 1/2002 | Yoden et al. |
| 2002/0010590 A1 | 1/2002 | Lee |
| 2002/0023101 A1 | 2/2002 | Kurihara et al. |
| 2002/0046018 A1 | 4/2002 | Marcu |
| 2002/0065848 A1 | 5/2002 | Walker et al. |
| 2002/0083103 A1 | 6/2002 | Ballance |
| 2002/0103698 A1 | 8/2002 | Cantrell |
| 2002/0112013 A1 | 8/2002 | Walsh |
| 2002/0120762 A1 | 8/2002 | Cheng et al. |
| 2002/0124109 A1 | 9/2002 | Brown |
| 2002/0178166 A1 | 11/2002 | Hsia |
| 2002/0178257 A1 | 11/2002 | Cerrato |
| 2002/0193983 A1 | 12/2002 | Tokieda et al. |
| 2003/0009320 A1 | 1/2003 | Furuta |
| 2003/0023757 A1 | 1/2003 | Ishioka et al. |
| 2003/0158953 A1 | 8/2003 | Lal |
| 2003/0163346 A1 | 8/2003 | Tinti et al. |
| 2003/0200094 A1 | 10/2003 | Gupta |
| 2004/0010496 A1 | 1/2004 | Behrendt et al. |
| 2004/0015723 A1 | 1/2004 | Pham et al. |
| 2004/0019849 A1 | 1/2004 | Weng et al. |
| 2004/0034520 A1 | 2/2004 | Langkilde-Geary |
| 2004/0039593 A1 | 2/2004 | Eskandari |
| 2004/0044517 A1 | 3/2004 | Palmquist |
| 2004/0044576 A1 | 3/2004 | Kurihara et al. |
| 2004/0148409 A1 | 7/2004 | Davis et al. |
| 2004/0187090 A1 | 9/2004 | Meacham |
| 2004/0255281 A1 | 12/2004 | Imamura et al. |
| 2005/0039116 A1 | 2/2005 | Slack-Smith |
| 2005/0086105 A1 | 4/2005 | McFadden et al. |
| 2005/0156714 A1 | 7/2005 | McCarthy et al. |
| 2005/0171944 A1 | 8/2005 | Palmquist |
| 2005/0187774 A1 | 8/2005 | Vuong |
| 2005/0189415 A1 | 9/2005 | Fano et al. |
| 2005/0203884 A1 | 9/2005 | Allen et al. |
| 2005/0228865 A1 | 10/2005 | Hirsch |
| 2005/0235351 A1 | 10/2005 | Seltzer et al. |
| 2005/0246283 A1 | 11/2005 | Gwiazda et al. |
| 2006/0041558 A1 | 2/2006 | McCauley et al. |
| 2006/0053367 A1 | 3/2006 | Chen et al. |
| 2006/0080257 A1 | 4/2006 | Vaughan et al. |
| 2006/0080265 A1 | 4/2006 | Hinds et al. |
| 2006/0080397 A1 | 4/2006 | Chene et al. |
| 2006/0095526 A1 | 5/2006 | Levergood et al. |
| 2006/0178918 A1 | 8/2006 | Mikurak |
| 2006/0248442 A1 | 11/2006 | Rosenstein et al. |
| 2006/0282255 A1 | 12/2006 | Lu |
| 2007/0016363 A1 | 1/2007 | Huang et al. |
| 2007/0022003 A1 | 1/2007 | Chao et al. |
| 2007/0033104 A1 | 2/2007 | Collins et al. |
| 2007/0043553 A1 | 2/2007 | Dolan |
| 2007/0047781 A1 | 3/2007 | Hull et al. |
| 2007/0048714 A1 | 3/2007 | Plastina et al. |
| 2007/0083425 A1 | 4/2007 | Cousineau et al. |
| 2007/0112553 A1 | 5/2007 | Jacobson |
| 2007/0118545 A1 | 5/2007 | Chandrasekharan et al. |
| 2007/0192374 A1 | 8/2007 | Abnous et al. |
| 2007/0208991 A1 | 9/2007 | Rider |
| 2007/0209005 A1 | 9/2007 | Shaver et al. |
| 2007/0209080 A1 | 9/2007 | Ture et al. |
| 2007/0226058 A1 | 9/2007 | Lorenzen et al. |
| 2007/0234213 A1 | 10/2007 | Krikorian et al. |
| 2008/0028300 A1 | 1/2008 | Krieger et al. |
| 2008/0086298 A1 | 4/2008 | Anismovich |
| 2008/0109374 A1 | 5/2008 | Levergood et al. |
| 2008/0120089 A1 | 5/2008 | Schurig |
| 2008/0120120 A1* | 5/2008 | Cirulli ............... G06Q 10/06 705/1.1 |
| 2008/0154577 A1 | 6/2008 | Kim |
| 2008/0195664 A1 | 8/2008 | Maharajh et al. |
| 2008/0201344 A1 | 8/2008 | Levergood et al. |
| 2008/0209320 A1 | 8/2008 | Mawhinney et al. |
| 2008/0244053 A1 | 10/2008 | Sampson et al. |
| 2008/0256235 A1 | 10/2008 | Or Sim et al. |
| 2008/0270398 A1 | 10/2008 | Landau et al. |
| 2008/0288240 A1 | 11/2008 | D'Agostini et al. |
| 2008/0316228 A1 | 12/2008 | Seljavaara |
| 2009/0061764 A1 | 3/2009 | Lockhart et al. |
| 2009/0094017 A1 | 4/2009 | Chen et al. |
| 2009/0099931 A1 | 4/2009 | Aaltonen et al. |
| 2009/0138458 A1 | 5/2009 | Wanker |
| 2009/0197580 A1 | 8/2009 | Gupta et al. |
| 2009/0217196 A1 | 8/2009 | Neff et al. |
| 2009/0217352 A1 | 8/2009 | Shen et al. |
| 2009/0234711 A1 | 9/2009 | Ramer et al. |
| 2009/0240539 A1 | 9/2009 | Slawson |
| 2009/0248801 A1 | 10/2009 | Then et al. |
| 2009/0259684 A1 | 10/2009 | Knight et al. |
| 2009/0313005 A1 | 12/2009 | Jaquinta |
| 2009/0313245 A1 | 12/2009 | Weyl et al. |
| 2010/0017704 A1 | 1/2010 | Jaffe et al. |
| 2010/0023475 A1 | 1/2010 | Lahav |

(56) References Cited

U.S. PATENT DOCUMENTS

| | | |
|---|---|---|
| 2010/0023581 A1 | 1/2010 | Lahav |
| 2010/0057439 A1 | 3/2010 | Ideuchi et al. |
| 2010/0057561 A1 | 3/2010 | Gifford |
| 2010/0070364 A1 | 3/2010 | Dugan |
| 2010/0070843 A1 | 3/2010 | Duym |
| 2010/0121630 A1 | 5/2010 | Mende et al. |
| 2010/0153404 A1 | 6/2010 | Ghosh et al. |
| 2010/0179803 A1 | 7/2010 | Sawaf |
| 2010/0211865 A1 | 8/2010 | Fanning et al. |
| 2010/0217783 A1 | 8/2010 | Farver et al. |
| 2010/0233996 A1 | 9/2010 | Herz et al. |
| 2010/0242069 A1 | 9/2010 | Jung et al. |
| 2010/0257457 A1 | 10/2010 | De Goes |
| 2010/0274661 A1 | 10/2010 | Aaltonen et al. |
| 2010/0281008 A1 | 11/2010 | Braunwarth |
| 2010/0305940 A1 | 12/2010 | Dendi et al. |
| 2010/0306402 A1 | 12/2010 | Russell et al. |
| 2010/0312619 A1 | 12/2010 | Ala-Pietila et al. |
| 2011/0010243 A1 | 1/2011 | Wilburn et al. |
| 2011/0022381 A1 | 1/2011 | Gao et al. |
| 2011/0047468 A1 | 2/2011 | Ishizaka |
| 2011/0060998 A1 | 3/2011 | Schwartz et al. |
| 2011/0066469 A1 | 3/2011 | Kadosh |
| 2011/0078626 A1 | 3/2011 | Bachman et al. |
| 2011/0097693 A1 | 4/2011 | Crawford |
| 2011/0125783 A1* | 5/2011 | Whale ............... G06F 16/435 707/769 |
| 2011/0191458 A1 | 8/2011 | Cheng et al. |
| 2011/0264736 A1 | 10/2011 | Zuckerberg et al. |
| 2011/0270975 A1 | 11/2011 | Troup |
| 2011/0313754 A1 | 12/2011 | Bastide et al. |
| 2012/0016655 A1 | 1/2012 | Travieso et al. |
| 2012/0022852 A1 | 1/2012 | Tregaskis |
| 2012/0023129 A1 | 1/2012 | Vedula et al. |
| 2012/0042006 A1 | 2/2012 | Kiley et al. |
| 2012/0096366 A1 | 4/2012 | Narla et al. |
| 2012/0131441 A1 | 5/2012 | Jitkoff et al. |
| 2012/0136718 A1 | 5/2012 | Katti |
| 2012/0143816 A1 | 6/2012 | Zhang et al. |
| 2012/0185759 A1 | 7/2012 | Balinsky et al. |
| 2012/0197718 A1 | 8/2012 | Martchenko et al. |
| 2012/0197770 A1 | 8/2012 | Raheja et al. |
| 2012/0197957 A1 | 8/2012 | de Voogd |
| 2012/0203861 A1 | 8/2012 | Flack et al. |
| 2012/0221319 A1 | 8/2012 | Trese |
| 2012/0221407 A1 | 8/2012 | Erasmus et al. |
| 2012/0233665 A1 | 9/2012 | Ranganathan et al. |
| 2012/0266076 A1 | 10/2012 | Lockhart et al. |
| 2012/0330644 A1 | 12/2012 | Giraudy et al. |
| 2012/0330990 A1 | 12/2012 | Chen et al. |
| 2013/0031470 A1 | 1/2013 | Daly, Jr. et al. |
| 2013/0036202 A1 | 2/2013 | Lahav |
| 2013/0054404 A1 | 2/2013 | Garcia |
| 2013/0067055 A1 | 3/2013 | Cheng |
| 2013/0091014 A1 | 4/2013 | Kellogg |
| 2013/0097488 A1 | 4/2013 | Coman et al. |
| 2013/0124185 A1 | 5/2013 | Sarr et al. |
| 2013/0124987 A1 | 5/2013 | Lakritz |
| 2013/0144566 A1 | 6/2013 | De Biswas |
| 2013/0151940 A1 | 6/2013 | Bailor et al. |
| 2013/0173247 A1 | 7/2013 | Hodson |
| 2013/0262986 A1 | 10/2013 | Leblond et al. |
| 2013/0304607 A1 | 11/2013 | Costa et al. |
| 2013/0325442 A1 | 12/2013 | Dahlmeier |
| 2013/0326345 A1 | 12/2013 | Haggart et al. |
| 2014/0019625 A1 | 1/2014 | Cheng et al. |
| 2014/0058718 A1 | 2/2014 | Kunchukuttan |
| 2014/0081775 A1 | 3/2014 | Leblond et al. |
| 2014/0082032 A1 | 3/2014 | Leblond et al. |
| 2014/0087760 A1 | 3/2014 | Bennett |
| 2014/0114864 A1 | 4/2014 | Babich et al. |
| 2014/0142917 A1 | 5/2014 | D'Penha |
| 2014/0142918 A1 | 5/2014 | Dotterer |
| 2014/0173414 A1 | 6/2014 | Chan et al. |
| 2014/0181013 A1 | 6/2014 | Micucci et al. |
| 2014/0229257 A1 | 8/2014 | Reistad et al. |
| 2014/0250369 A1 | 9/2014 | Mitnick et al. |
| 2014/0278342 A1 | 9/2014 | Shoshan et al. |
| 2014/0297252 A1 | 10/2014 | Prasad et al. |
| 2014/0297759 A1 | 10/2014 | Mody |
| 2014/0298483 A1 | 10/2014 | Kato |
| 2014/0304080 A1 | 10/2014 | Yilmaz |
| 2014/0310229 A1 | 10/2014 | Lahav |
| 2014/0351053 A1 | 11/2014 | Link |
| 2014/0358519 A1 | 12/2014 | Mirkin |
| 2014/0358524 A1 | 12/2014 | Papula |
| 2014/0365201 A1 | 12/2014 | Gao |
| 2015/0040000 A1 | 2/2015 | Rice et al. |
| 2015/0051896 A1 | 2/2015 | Simard |
| 2015/0052424 A1 | 2/2015 | Sikchi et al. |
| 2015/0074518 A1 | 3/2015 | Rumsey et al. |
| 2015/0149885 A1 | 5/2015 | Homer et al. |
| 2015/0149886 A1 | 5/2015 | Homer et al. |
| 2015/0186362 A1 | 7/2015 | Li |
| 2015/0188961 A1 | 7/2015 | Ricci |
| 2015/0213259 A1 | 7/2015 | Du et al. |
| 2015/0213363 A1 | 7/2015 | Lahav |
| 2015/0254732 A1 | 9/2015 | Snyder |
| 2015/0310504 A1 | 10/2015 | Potter |
| 2016/0014088 A1 | 1/2016 | Maekawa |
| 2016/0248785 A1 | 8/2016 | Petry et al. |
| 2016/0275057 A1 | 9/2016 | Dendi et al. |
| 2017/0124069 A1 | 5/2017 | Bondarchuk et al. |
| 2017/0149683 A1 | 5/2017 | Cheng et al. |
| 2018/0314674 A1 | 11/2018 | Homer et al. |
| 2019/0065514 A1 | 2/2019 | Siddiquee et al. |
| 2019/0158567 A1 | 5/2019 | Siddiquee et al. |

FOREIGN PATENT DOCUMENTS

| | | |
|---|---|---|
| AU | 5202299 A | 10/1999 |
| CA | 2221506 A1 | 12/1996 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| EP | 0830774 A2 | 3/1998 |
| EP | 1128301 A2 | 8/2001 |
| EP | 1128302 A2 | 8/2001 |
| EP | 1128303 A2 | 8/2001 |
| EP | 0803103 A1 | 2/2002 |
| EP | 1235177 A2 | 8/2002 |
| EP | 0734556 B1 | 9/2002 |
| EP | 0830774 B1 | 10/2004 |
| EP | 1489523 A2 | 12/2004 |
| EP | 1170680 A2 | 8/2005 |
| EP | 2299369 A1 | 3/2011 |
| EP | 2668599 A1 | 12/2013 |
| EP | 2668626 A1 | 12/2013 |
| EP | 2678814 A1 | 1/2014 |
| EP | 2896007 A1 | 7/2015 |
| EP | 2896008 A1 | 7/2015 |
| GB | 2241359 A | 8/1991 |
| JP | H10509543 A | 9/1998 |
| JP | H11507752 A | 7/1999 |
| JP | 2001117847 A | 4/2001 |
| JP | 2001136583 A | 5/2001 |
| JP | 3190881 B2 | 7/2001 |
| JP | 3190882 B2 | 7/2001 |
| JP | 2001188992 A | 7/2001 |
| JP | 2001350790 A | 12/2001 |
| JP | 3260693 B2 | 2/2002 |
| JP | 2002073677 A | 3/2002 |
| JP | 2002132822 A | 5/2002 |
| JP | 3367675 B2 | 1/2003 |
| JP | 2003032660 A | 1/2003 |
| JP | 2003157402 A | 5/2003 |
| JP | 2003216608 A | 7/2003 |
| JP | 2004538542 A | 12/2004 |
| JP | 2005056080 A | 3/2005 |
| JP | 2005174120 A | 6/2005 |
| JP | 2005267535 A | 9/2005 |

(56) References Cited

FOREIGN PATENT DOCUMENTS

| | | | |
|---|---|---|---|
| JP | 3762882 B2 | 4/2006 |
| JP | 2006216073 A | 8/2006 |
| JP | 2006260329 A | 9/2006 |
| JP | 2007042127 A | 2/2007 |
| JP | 2008027265 A | 2/2008 |
| JP | 2009020845 A | 1/2009 |
| JP | 2009518761 A | 5/2009 |
| JP | 2009301480 A | 12/2009 |
| JP | 4485548 B2 | 6/2010 |
| JP | 2010152588 A | 7/2010 |
| JP | 2011002905 A | 1/2011 |
| JP | 4669373 B2 | 4/2011 |
| JP | 4669430 B2 | 4/2011 |
| JP | 5952307 B2 | 7/2016 |
| JP | 5952312 B2 | 7/2016 |
| JP | 6138054 B2 | 6/2017 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9819224 A2 | 5/1998 |
| WO | WO9952626 A1 | 10/1999 |
| WO | WO2002039318 A1 | 5/2002 |
| WO | WO20030081441 A1 | 10/2003 |
| WO | WO2007068123 A1 | 6/2007 |
| WO | WO20070118424 A1 | 10/2007 |
| WO | WO2010062540 A1 | 6/2010 |
| WO | WO2010062542 A1 | 6/2010 |
| WO | WO2012101240 A1 | 8/2012 |
| WO | WO2012101243 A1 | 8/2012 |
| WO | WO2012113791 A1 | 8/2012 |
| WO | WO2013144358 A2 | 10/2013 |
| WO | WO2013167734 A1 | 11/2013 |
| WO | WO2014041148 A1 | 3/2014 |
| WO | WO2014041149 A1 | 3/2014 |

OTHER PUBLICATIONS

Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.

Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.

Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.

Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.

Aramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.

Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.

Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.

Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.

Hardmeier et al. "Tree Kernels for Machine Translation Quality Estimation" [W12-3112] Proceedings of the Seventh Workshop on Statistical Machine Translation,Jun. 7, 2012, pp. 109-113. Retrieved from: http://aclanthology.info/volumes/proceedings-of-the-seventh-workshop-onstatistical-machine-translation.

Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.

Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.

Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.

Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.

Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.

Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.

Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.

Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.

"Best Practices—Knowledge Base," Lilt website [online], Mar. 6, 2017 [retrieved on Oct. 19, 2017], Retrieved from the internet:<https://lilt.com/kb/translators/best-practices>, 2 pages.

"Data Security—Knowledge Base," Lilt website [online], Oct. 14, 2016 [retrieved on Oct. 19, 2017], Retrieved from the internet:<https://lilt.com/kb/security>, 1 pages.

"Data Security and Confidentiality," Lilt website [online], 2017 [retrieved on Oct. 19, 2017], Retrieved from the Internet: <https://lilt.com/security>, 7 pages.

"Memories—Knowledge Base," Lilt website [online], Jun. 7, 2017 [retrieved on Oct. 19, 2017], Retrieved from the Internet:<https://lilt.com/kb/project-managers/memory>, 4 pages.

"Memories (API)—Knowledge Base," Lilt website [online], Jun. 2, 2017 [retrieved on Oct. 19, 2017], Retrieved from the internet:<https://lilt.com/kb/api/memories>, 1 page.

(56) References Cited

OTHER PUBLICATIONS

"Quoting—Knowledge Base," Lilt website [online], Jun. 7, 2017 [retrieved on Oct. 19, 2017], Retrieved from the Internet: (https://lilt.com/kb/project-managers/quoting>, 4 pages.
"The Editor—Knowledge Base," Lilt website [online], Aug. 15, 2017 [retrieved on Oct. 19, 2017], Retrieved from the Internet:<https://lilt.com/kb/translators/editor>, 5 pages.
"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.
"What is Lilt_—Knowledge Base," Lilt website [online],Dec. 15, 2016 [retrieved on Oct. 19, 2017], Retrieved from the Internet:<https://lilt.com/kb/what-is-lilt>, 1 page.
"Getting Started—Knowledge Base," Lilt website [online], Apr. 11, 2017 [retrieved on Oct. 20, 2017], Retrieved from the Internet:<https://lilt.com/kb/translators/getting-started>, 2 pages.
"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.
"Lilt API_API Reference," Lilt website [online], retrieved on Oct. 20, 2017, Retrieved from the Internet:<https://lilt.com/docs/api>, 53 pages.
"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.
"Projects—Knowledge Base," Lilt website [online], Jun. 7, 2017, retrieved on Oct. 20, 2017, Retrieved from the Internet: (https://lilt.com/kb/project-managers/projects>, 3 pages.
"Getting Started with lilt," Lilt website [online], May 30, 2017, retrieved on Oct. 20, 2017, Retrieved from the Internet:<https://lilt.com/kb/api/lilt-js>, 6 pages.
"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.
Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information_retrieval.
Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.
Sethy et al., "Building Topic Specific Language Models Fromwebdata Using Competitive Models," INTERSPEECH 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.
Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.
Business Wire, "Language Weaver Introduces User-Managed Customization Tool," Oct. 25, 2005, 3 pages. Retrieved from http:ProQuest.
Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.
Potet et al., "Preliminary Experiments on Using Users' Post-Editions to Enhance a SMT System," Proceedings of the European Association for Machine Translation (EAMT), May 2011, pp. 161-168. Retrieved from Retrieved at http://www.mt-archive.info/EAMT-2011-Potet.pdf.
Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.
Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.
Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.
Levenberg et al."Stream-based Translation Models for Statistical Machine Translation" Human Language Technologies: The 2010 Annual Conference of the North American chapter of the ACL, Dec. 31, 2010, pp. 394-402.
Lagarda et al. "Statistical Post-Editing of a Rule Based Machine Translation System" Proceedings of NAACL HLT 2009: Short Papers, Jun. 2009, pp. 217-220.
Ehara, "Rule Based Machine Translation Combined with Statistical Post Editor for Japanese to English Patent Translation," MT Summit XI, 2007, pp. 13-18.
Bechara et al. "Statistical Post-Editing for a Statistical MT System" Proceedings of the 13th Machine Translation Summit, 2011, pp. 308-315.
Summons to Attend Oral Proceedings, European Patent Application No. 12703483.3, Nov. 30, 2017, 11 pages.
"Web analytics," Wikipedia [online], Jan. 27, 2001 [retrieved on Sep. 11, 2017], Retrieved from the Internet: <URL: https://en.wikipedia.org/w/index.php?title=Web_analytics&oldid=410384013>, 11 pages.
"Examining Division Preliminary Opinion," European Patent Application No. 12703483.3, Apr. 30, 2018, 9 pages.
"Decision to Refuse," European Patent Application No. 12703483.3, Jun. 19, 2018, 24 pages.
"Minutes of Oral Proceeding", European Patent Application No. 12703483.3, Jun. 19, 2018, 4 pages.
Non-Final Office Action, dated Nov. 26, 2003, U.S. Appl. No. 09/665,241, filed Sep. 18, 2000.
Final Office Action, dated Sep. 10, 2004, U.S. Appl. No. 09/665,241, filed Sep. 18, 2000.
Non-Final Office Action, dated Jun. 3, 2005, U.S. Appl. No. 09/665,241, filed Sep. 18, 2000.
Non-Final Office Action, dated Oct. 11, 2005, U.S. Appl. No. 10/003,315, filed Dec. 6, 2001.
Non-Final Office Action, dated Dec. 1, 2005, U.S. Appl. No. 09/665,241, filed Sep. 18, 2000.
Final Office Action, dated Mar. 14, 2006, U.S. Appl. No. 09/665,241, Sep. 18, 2000.
Final Office Action, dated Jun. 1, 2006, U.S. Appl. No. 10/003,315, filed Dec. 6, 2001.
Advisory Action, dated Jun. 12, 2006, U.S. Appl. No. 09/665,241, filed Sep. 18, 2000.
Non-Final Office Action, dated Oct. 20, 2006, U.S. Appl. No. 09/665,241, filed Sep. 18, 2000.
Non-Final Office Action, dated Jul. 23, 2007, U.S. Appl. No. 10/003,315, filed Dec. 6, 2001.
Final Office Action, dated Jul. 24, 2007, U.S. Appl. No. 09/665,241, filed Sep. 18, 2000.
Notice of Allowance, dated Jan. 30, 2008, U.S. Appl. No. 09/665,241, filed Sep. 18, 2000.
Final Office Action, dated Apr. 17, 2008, U.S. Appl. No. 10/003,315, filed Dec. 6, 2001.
Non-Final Office Action, dated Apr. 20, 2010, U.S. Appl. No. 10/003,315, filed Dec. 6, 2001.
Notice of Allowance, dated Oct. 28, 2010, U.S. Appl. No. 10/003,315, filed Dec. 6, 2001.
Non-Final Office Action, dated Aug. 19, 2011, U.S. Appl. No. 13/019,980, filed Feb. 2, 2011.

(56) References Cited

OTHER PUBLICATIONS

Notice of Allowance, dated Jun. 13, 2012, U.S. Appl. No. 13/019,980, filed Feb. 2, 2011.
Non-Final Office Action, dated Nov. 26, 2012, U.S. Appl. No. 13/016,988, filed Jan. 29, 2011.
Non-Final Office Action, dated Jan. 17, 2013, U.S. Appl. No. 13/016,989, filed Jan. 29, 2011.
Non-Final Office Action, dated May 23, 2013, U.S. Appl. No. 13/035,852, filed Feb. 25, 2011.
Final Office Action, dated Jun. 14, 2013, U.S. Appl. No. 13/016,988, filed Jan. 29, 2011.
Non-Final Office Action, dated Nov. 19, 2013, U.S. Appl. No. 13/016,989, filed Jan. 29, 2011.
Final Office Action, dated Feb. 3, 2014, U.S. Appl. No. 13/035,852, filed Feb. 25, 2011.
Advisory Action, dated Apr. 16, 2014, U.S. Appl. No. 13/035,852, filed Feb. 25, 2011.
Non-Final Office Action, dated May 6, 2014, U.S. Appl. No. 13/609,293, filed Sep. 11, 2012.
Non-Final Office Action, dated May 9, 2014, U.S. Appl. No. 13/436,656, filed Mar. 30, 2012.
Final Office Action, dated Jul. 1, 2014, U.S. Appl. No. 13/016,989, filed Jan. 29, 2011.
Non-Final Office Action, dated Sep. 11, 2014, U.S. Appl. No. 13/016,988, filed Jan. 29, 2011.
Final Office Action, dated Dec. 4, 2014, U.S. Appl. No. 13/436,656, filed Mar. 30, 2012.
Non-Final Office Action, dated Feb. 26, 2015, U.S. Appl. No. 13/886,194, filed May 2, 2013.
Non-Final Office Action, dated Mar. 2, 2015, U.S. Appl. No. 13/016,989, filed Jan. 29, 2011.
Final Office Action, dated Mar. 18, 2015, U.S. Appl. No. 13/609,293, filed Sep. 11, 2012.
Final Office Action, dated Apr. 6, 2015, U.S. Appl. No. 13/016,988, filed Jan. 29, 2011.
Non-Final Office Action, dated May 19, 2015, U.S. Appl. No. 13/886,199, filed May 2, 2013.
Non-Final Office Action, dated Jun. 8, 2015, U.S. Appl. No. 13/436,656, filed Mar. 30, 2012.
Advisory Action, dated Jun. 29, 2015, U.S. Appl. No. 13/609,293, filed Sep. 11, 2012.
Final Office Action, dated Sep. 23, 2015, U.S. Appl. No. 13/016,989, filed Jan. 29, 2011.
Non-Final Office Action, dated Sep. 29, 2015, U.S. Appl. No. 14/023,384, filed Sep. 10, 2013.
Non-Final Office Action, dated Oct. 30, 2015, U.S. Appl. No. 14/091,329, filed Nov. 26, 2013.
Non-Final Office Action, dated Dec. 14, 2015, U.S. Appl. No. 13/886,194, filed May 2, 2013.
Final Office Action, Jan. 7, 2016, U.S. Appl. No. 13/436,656, filed Mar. 30, 2012.
Final Office Action, dated Jan. 19, 2016, U.S. Appl. No. 13/886,199, filed May 2, 2013.
Advisory Action, dated Feb. 9, 2016, U.S. Appl. No. 13/016,989, filed Jan. 29, 2011.
Advisory Action, dated Mar. 8, 2016, U.S. Appl. No. 13/436,656, filed Mar. 30, 2012.
Non-Final Office Action, dated Mar. 10, 2016, U.S. Appl. No. 13/035,852, filed Feb. 25, 2011.
Non-Final Office Action, dated May 3, 2016, U.S. Appl. No. 13/609,293, filed Sep. 11, 2012.
Final Office Action, dated May 3, 2016, U.S. Appl. No. 14/023,384, filed Sep. 10, 2013.
Notice of Allowance, dated May 4, 2016, U.S. Appl. No. 13/436,656, filed Mar. 30, 2012.
Non-Final Office Action, dated May 11, 2016, U.S. Appl. No. 13/016,988, filed Jan. 29, 2011.
Final Office Action, dated Jun. 14, 2016, U.S. Appl. No. 14/091,329, filed Nov. 26, 2013.
Final Office Action, dated Jul. 12, 2016, U.S. Appl. No. 13/886,194, filed May 2, 2013.
Non-Final Office Action, dated Jul. 14, 2016, U.S. Appl. No. 14/093,015, filed Nov. 28, 2013.
Notice of Allowance, dated Aug. 24, 2016, U.S. Appl. No. 13/016,988, filed Jan. 29, 2011.
Advisory Action, dated Sep. 8, 2016, U.S. Appl. No. 14/091,329, filed Nov. 26, 2013.
Non-Final Office Action, dated Sep. 28, 2016, U.S. Appl. No. 13/016,989, filed Jan. 29, 2011.
Final Office Action, dated Oct. 6, 2016, U.S. Appl. No. 13/035,852, filed Feb. 25, 2011.
Final Office Action, dated Oct. 31, 2016, U.S. Appl. No. 13/886,194, filed May 2, 2013.
Final Office Action, dated Nov. 3, 2016, U.S. Appl. No. 14/093,015, filed Nov. 28, 2013.
Notice of Allowance, dated Nov. 7, 2016, U.S. Appl. No. 13/609,293, filed Sep. 11, 2012.
Non-Final Office Action, dated Nov. 28, 2016, U.S. Appl. No. 13/891,029, filed May 9, 2013.
Non-Final Office Action, dated Nov. 28, 2016, U.S. Appl. No. 14/023,384 Sep. 10, 2013.
Advisory Action, dated Nov. 29, 2016, U.S. Appl. No. 13/035,852, filed Feb. 25, 2011.
Advisory Action, dated Jan. 13, 2017, U.S. Appl. No. 14/093,015, filed Nov. 28, 2013.
Non-Final Office Action, dated Jan. 18, 2017, U.S. Appl. No. 14/091,329, filed Nov. 26, 2013.
Final Office Action, dated Jan. 24, 2017, U.S. Appl. No. 13/886,194, filed May 2, 2013.
Advisory Action, dated Feb. 9, 2017, U.S. Appl. No. 14/093,015, filed Nov. 28, 2013.
Final Office Action, dated Apr. 20, 2017, U.S. Appl. No. 13/016,989, filed Jan. 29, 2011.
Advisory Action, dated Apr. 28, 2017, U.S. Appl. No. 13/886,194, filed May 2, 2013.
Notice of Allowance, dated May 9, 2017, U.S. Appl. No. 13/891,029, filed May 9, 2013.
Notice of Allowance, dated Jun. 14, 2017, U.S. Appl. No. 14/023,384, filed Sep. 10, 2013.
Non-Final Office Action, dated Jun. 15, 2017, U.S. Appl. No. 13/035,852, filed Feb. 25, 2011.
Advisory Action, dated Jun. 23, 2017, U.S. Appl. No. 13/886,194, filed May 2, 2013.
Non-Final Office Action, dated Jul. 11, 2017, U.S. Appl. No. 15/423,305, filed Feb. 2, 2017.
Non-Final Office Action, dated Jul. 26, 2017, U.S. Appl. No. 13/886,199, filed May 2, 2013.
Non-Final Office Action, dated Aug. 8, 2017, U.S. Appl. No. 13/016,989, filed Jan. 29, 2011.
Final Office Action, dated Sep. 21, 2017, U.S. Appl. No. 14/091,329, filed Nov. 26, 2013.
"The GNU Make Manual", Version 3.79, edition 0.55, Apr. 2000, Free Software Foundation, Inc, pp. 1-8, 118, 128.
Rational Software Corporation, "Introduction to ClearCase", Dec. 1999, Rational ClearCase, Release 4.0, pp. i-xiv, 1, 2, 30, 33, 37, 40, 59.
Rational Software Corporation, "Administering ClearCase", Rational ClearCase Release 4.0, 1999, pp. i-xxx, 1-6, 129-162, 255-260, 278, 281, 283, 345-348.
Challenger et al., "A Scalable System for Consistently Caching Dynamic Web Data", INFOCOM '99. Eighteenth Annual Joint Conference of the IEEE Computer and Communications Societies. Proceedings. IEEE, Mar. 21-25, 1999, pp. 294-303, vol. 1, 10 pages.
Challenger et al., "A Publishing System for Efficiently Creating Dynamic Web Content", INFOCOM 2000. Nineteenth Annual Joint Conference of the IEEE Computer and Communications Societies. Proceedings. IEEE, Mar. 26-30, 2000, vol. 2, pp. 1-7, 10.
Croll et al., "Content Management—The Users Requirements", International Broadcasting Convention, Conference Publication No. 447, Sep. 12-16, 1997, 4 pages.
Idiom, Inc. "WorldServer 2 White Paper", 2000, 19 pages.

(56) References Cited

OTHER PUBLICATIONS

Market Wire. "VerticalNet Selects Uniscape as Globalization Provider to Speed Global Expansion", Jun. 2000, <www.findarticles.com/p/articles/mi_pwwi/is_200006/ai_mark01011558/print> accessed on Oct. 1, 2005, 2 pages.
PRNewsWire and News desk. "Personify Selects Uniscape to Enable Ebusiness Solutions for Global Markets", Aug. 30, 2000, <www.findwealth.com/personify-selects-uniscape-to-enable-180593pr.html> accessed on Oct. 1, 2005, 2 pages.
Uniscape, Inc. "Uniscape, Inc. Home Page", publicly posted Feb. 20, 1999, <web.archive.org/web/19990220195249//http://www.uniscape-inc.com/> accessed on Oct. 1, 2005, 2 pages.
Business Wire. "Uniscape Introduces Pilot Program to Provide Multilingual Website Management Solutions," Feb. 11, 1999, <www.findarticles.com/p/articles/mi_m0EIN/is_1999_Feb_11/11/ai_53852378> accessed on May 9, 2011, 1 page.
Business Wire. "Uniscape Announces New Solution for Automating Management of Software Localization Process," Aug. 17, 1998, <www.findarticles.com/p/articles/mi_m0EIN/is_1998_August_17/ai_21090247> accessed on Sep. 30, 2005, 2 pages.
Market Wire. "Cephren Relies on Uniscape During Rapid Global eBusiness Expansion," Oct. 18, 2000, <www.marketwire.com/mw/iwpr?id=18115&cat=te> accessed on Oct. 1, 2005, 2 pages.
Anonymous; "MyYahoo?—RSS Headlines Module—Frequently Asked Questions," Jan. 24, 2007, XP002508567, [retrieved on Dec. 17, 2008], Retrieved from the Internet: <URL:http://web.archive.org/web/20040124175>, 4 pages.
"Krishnan, ""Unmittelbare Ergenbnisse Noch Schneller: Google Vorschau—Der Google Produkt-Kompass,"" Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages."
Unidex, Inc.: "XML Convert," Aug. 4, 2007, <http://www.unidex.com/xflat.htm> accessed on Apr. 5, 2012, 1 page.
Wikipedia—"SOAP," Jan. 22, 2011, <http://en.wikipedia.org/w/index.php?title=SOAP&oldid=409349976> accessed on Apr. 4, 2012, 5 pages.
Mutz et al., "User-Agent Display Attributes," HTTP Working Group, Nov. 26, 1996, 6 pages.
XP007905525, The Technical Aspects Identified in the Present Application (Art. 15 PCT) are considered part of common general knowledge. Due to their notoriety no documentary evidence is found to be required. Official Journal Nov. 2007, pp. 592-593.
"International Search Report" and "Written Opinion", Patent Cooperation Treaty Application No. PCT/EP2012/051284, dated Apr. 26, 2012, 8 pages.
"International Search Report" and "Written Opinion", Patent Cooperation Treaty application No. PCT/EP2012/052934, dated May 15, 2012, 6 pages.
"International Search Report" and "Written Opinion", Patent Cooperation Treaty application No. PCT/EP2012/051291, dated May 2, 2012, 11 pages.
"International Search Report" and "Written Opinion", Patent Cooperation Treaty application No. PCT/EP2013/056842, dated Oct. 23, 2013, 8 pages.
"International Search Report" and "Written Opinion", Patent Cooperation Treaty application No. PCT/EP2013/069078, Jan. 8, 2014, 6 pages.
"International Search Report" and "Written Opinion", Patent Cooperation Treaty application No. PCT/EP2013/069077, dated Jan. 8, 2014, 6 pages.
Colligan et al.; Special Edition Using Microsoft Office FrontPage 2003; 2004; Que Publishing; pp. 50-91 and 323-326.
"Highlight;" Microsoft Computer Dictionary; May 1, 2002; Microsoft Press; p. 320.
"Office Action", European Patent Convention application No. 12707723.8, dated Jun. 17, 2014, 5 pages.
"Office Action", European Patent Convention application No. 12707723.8, dated Feb. 11, 2015, 7 pages.
"Inheritance (object-oriented programming)", archived Wikipedia on Sep. 4, 2011, http://en.wikipedia.org/w/index.php?title=Inheritance_(object-oriented_programming)&oldid=448382925, pp. 1-7.
"Result of Consultation", European Patent Convention application No. 12707723.8, May 28, 2015, 3 pages.
"Office Action", European Patent Convention application No. 12707723.8, dated Jun. 29, 2015, 30 pages.
"Minutes of Oral Proceeding", European Patent Convention application No. 12707723.8, dated Jun. 29, 2015, 8 pages.
Preview; Feb. 26, 2011; Dictionary.com; 2 pages.
Edgar; "Why Do Browsers Display My Site Differently?" Jun. 3, 2009 (updated Nov. 2010); matthewedgar.net; pp. 1-5.
"Office Action", Japanese Patent Application 2013-550887, dated Jan. 5, 2016, 10 pages [20 pages with translation].
"Office Action", Japanese Patent Application 2013-550888, dated Dec. 22, 2015, 4 pages [8 pages with translation].
"Office Action", Japanese Patent Application 2013-554869, dated Feb. 9, 2016, 2 pages [4 pages with translation].
"Notice of Allowance" Japanese Patent Application 2013-550888, dated May 24, 2016, 3 pages.
"Notice of Allowance", Japanese Patent Application 2013-554869, dated May 24, 2016, 3 pages.
"Office Action," Japan Patent Application No. 2013-550887, Oct. 4, 2016, 4 pages [8 pages including translation].
"Office Action," European Patent Application No. 12703482.5, Sep. 6, 2016, 4 pages.
Wikipedia; "Serialization"; Nov. 14, 2013; 10 pages; https://web.archive.org/web/20131114152415/http://en.wikipedia.org/wiki/Serialization.
Microsoft, MSDN; "Serialization .NET Framework 4.5"; Jan. 10, 2013; 2 pages; https://web.archive.org/web/20130110102559/http://msdn.microsoft.com/en-us/library/7ay27kt9(v=vs.110).aspx.
"Office Action," European Patent Application No. 12703483.3, dated Jan. 25, 2017, 7 pages.
"Notice of Allowance," Japan Patent Application No. 2013-550887, dated Apr. 11, 2017, 3 pages.
Schafer, Ben J. et al., "Recommender Systems in E-Commerce," Proceedings of the 1st ACM conference on Electronic Commerce (EC '99), ACM, New York, NY, 1999, pp. 158-166.
"Summons to Attend Oral Proceedings," European Patent Application No. 12703482.5, Feb. 14, 2018, 10 pages.
"Office Action," European Patent Application No. 13776975.8, dated Jun. 4, 2018, 11 pages.
"Decision to Refuse," European Patent Application No. 12703482.5, dated Sep. 17, 2018, 4 pages.
Leblond, Dominique, "Blueprinting of Multimedia Assets", U.S. Appl. No. 13/619,591, filed Sep. 14, 2012, 40 pages.
"Summons to Attend Oral Proceedings," European Patent Application No. 13776975.8, Jul. 2, 2019, 18 pages.
Eckerson, Wayne, "Performance Management Strategies: How to Create and Deploy Effective Metrics," TDWI Best Practices Report, First Quarter (2009), 35 pages.
Hasegawa et al., "Multilingual Disaster Information System: Information Delivery Using Graphic Text for Mobile Phones," AI & Soc 19, 2005, pp. 265-278.

* cited by examiner

METHOD AND SYSTEM FOR RECOMMENDING PRODUCTS BASED ON A RANKING COCKTAIL

CROSS REFERENCES TO RELATED APPLICATIONS

This Non-Provisional U.S. patent application is a continuation of, and claims the priority benefit of, U.S. Non-provisional patent application Ser. No. 13/891,029 filed on May 9, 2013 and titled "Method and System for Recommending Products Based on a Ranking Cocktail, which in turns claims the priority benefit of U.S. Provisional Patent Application No. 61/646,187, filed on May 11, 2012, titled "E-COMMERCE PERSONALIZATION AND MERCHANDISING." The disclosure of the above applications are incorporated by reference herein in their entirety, including all references cited therein.

FIELD OF THE INVENTION

The present invention relates generally to electronic commerce (e.g., ecommerce) websites, and more specifically, but not by way of limitation, to e-commerce websites that leverage subjective and/or objective consumer preferences, such as brand preferences, web analytics, contextual/behavioral data, and so forth, of consumers to present products to the consumer that are highly relevant and targeted.

BACKGROUND

The quantity of products provided for sale in physical retail establishments is inherently limited by the physical space occupied by the retail establishment. Being unbound by such physical constraints, e-commerce websites may therefore offer an almost unlimited number of products for sale. Deleteriously, consumers may become frustrated with the limitless number of products with which they are presented. Often times, many of the products presented to the consumer are irrelevant to the wants, desires, and or preferences of the consumer.

Additionally, physical retail establishments may utilize merchandising techniques to ensure proper product placement of items within the retail environment. These merchandising activities can increase the likelihood that a consumer may purchase a product. E-commerce websites are currently limited in their merchandising capabilities because the amount of products and/or associated merchandising that can be presented to the consumer at one time is limited by the dimensions of the display device (e.g., computer screen) with which the consumer is interacting. Therefore, the space needs to be filled with appropriately targeted products to maximize product conversions.

SUMMARY

According to some embodiments, the present disclosure is directed to a method for providing recommended products to a consumer using a product recommendation and personalization system. The method may include: (a) determining triggers for a consumer, the triggers being associated with objective consumer preferences and subjective consumer preferences for the consumer; (b) selecting a ranking cocktail for the consumer, the ranking cocktail comprising a plurality of attributes that each comprise a weight, the ranking cocktail being selected based upon the triggers for the consumer; (c) utilizing the ranking cocktail to select recommended products from an inventory of products in a database of a merchant; and (d) providing the recommended products for display to the consumer.

According to some embodiments, the present disclosure is directed to a method for generating a ranking cocktail for a personalization system that includes: (a) receiving selections of a plurality of attributes from a consumer; (b) receiving a weight for at least one of the plurality of attributes, wherein some of the plurality of attributes are non-weighted; (c) automatically distributing unallocated weight to the non-weighted attributes such that a total weight of the ranking cocktail equals 100%; and (c) storing the ranking cocktail in a database.

According to some embodiments, the present disclosure is directed to a product recommendation system that comprises: (a) a processor; and (b) logic encoded in one or more tangible media for execution by the processor and when executed operable to perform operations comprising: (i) determining triggers for a consumer, the triggers being associated with objective consumer preferences and subjective consumer preferences for the consumer; (ii) selecting a ranking cocktail for the consumer, the ranking cocktail comprising a plurality of attributes that each comprise a weight, the ranking cocktail being selected based upon the triggers for the consumer; (iii) utilizing the ranking cocktail to select recommended products from an inventory of products in a database of a merchant; and (iv) providing the recommended products for display to the consumer via an e-commerce website.

DETAILED DESCRIPTION OF EXEMPLARY EMBODIMENTS

Figure 1:
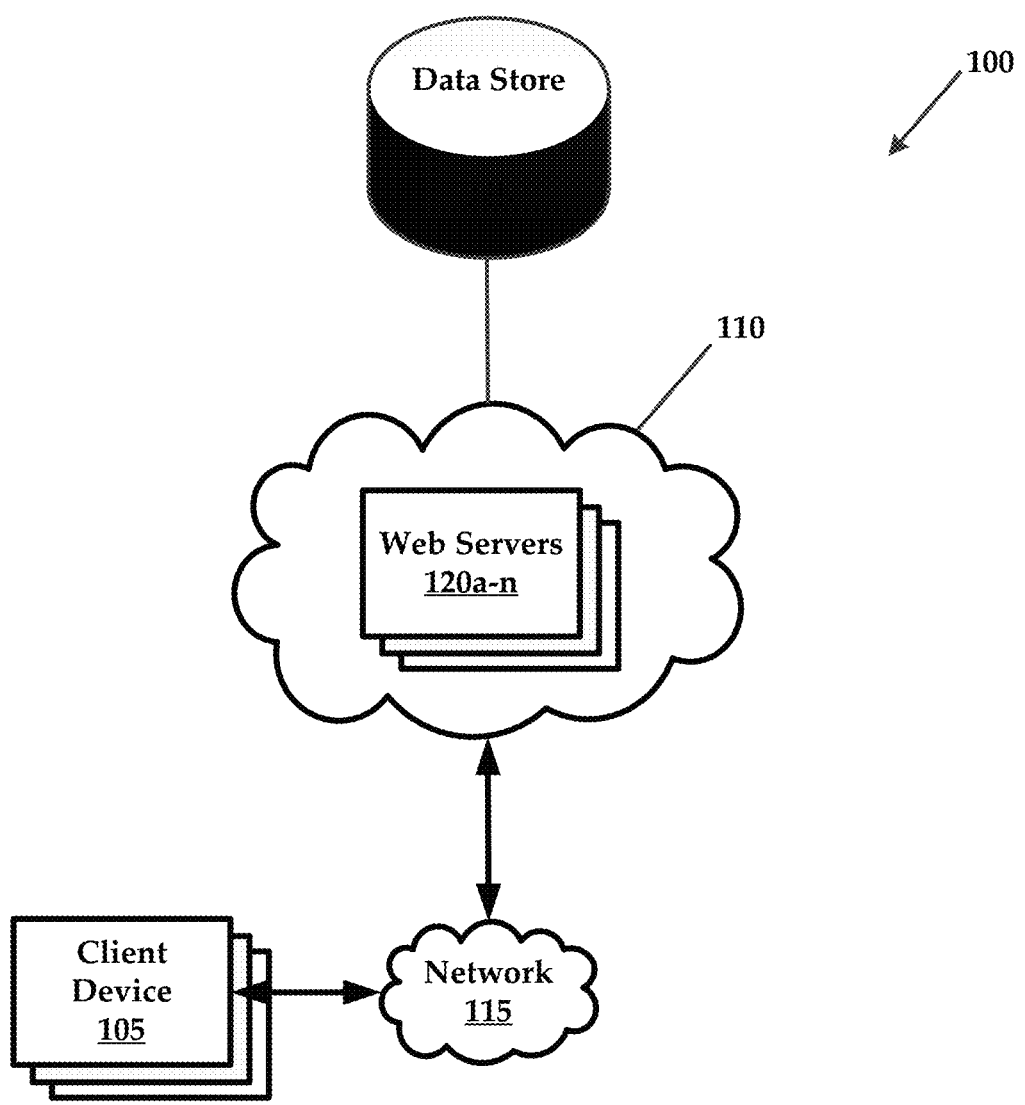
FIG. 1 is an exemplary computing architecture that may be utilized to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be utilized to present highly relevant products to consumers via an e-commerce website. The presentation of relevant products to the consumer may also be referred to as a campaign. Using the present technology, marketers and merchants may display the highly relevant item(s), to appropriate consumers, at the right time, in order to maximize product sales or customer conversions. These and other advantages of the present technology will be discussed in greater detail below with reference to the collective figures (e.g., FIGS. 1-6).

FIG. 1 is a block diagram of an exemplary architecture 100, constructed in accordance with various embodiments of the present technology. The architecture 100 may include a plurality of end user client devices such as client device 105. It will be understood that the client device 105 may include computing systems such as the exemplary computing system 600 described in greater detail with regards to FIG. 6. The client device 105 may communicatively couple and interact with a personalization and recommendation system, hereinafter "system 110" via a network 115 that may include the Internet, an Intranet network such as a L.A.N. (Local Area Network) or W.A.N. (Wide Area Network), a V.P.N. (Virtual Private Network)—just to name a few.

In some embodiments, the system 110 may be configured as a cloud-based computing environment. In general, a cloud-based computing environment is a resource that typically combines the computational power of a large grouping of processors (such as within web servers 120*a-n*) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers such as web servers 120*a-n*, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The system 110 may leverage personalized information for consumers to present highly relevant products and/or conduct search queries of inventories associated with e-commerce websites, for products to produce highly relevant search results. In general, personalized information may comprise objective data gathered about a consumer such as height, sex, race, nationality, age, or other demographic/psychographic/analytical information. Personalization information determined for a consumer may be stored in consumer records via one or more data stores such as a data store 125. Additional types of objective data may comprise behavioral/web analytic information such as websites visited, click through data, average time spent on a webpage, search histories, shopping cart items, past purchasing data, and so forth. In some instances, objective data may also comprise other types of user-generated content that may be analyzed or evaluated for preference data such as buying preferences, patterns, and so forth.

Personalization may also comprise subjective data about the consumer such as favorite brand, favorite designer, favorite color, and so forth. These types of subjective data may also be inferred from various types of objective data about the consumer. For example, the system may infer the favorite designer for the consumer by evaluating past purchasing history, or a demographic bracket into which the age of the consumer is positioned. In other instances, consumers may provide their subjective preferences to a retailer or marketer by way of a survey or other data acquisition method that would be known to one of ordinary skill in the art.

In some embodiments, contextual and cultural preferences may also be considered by the system 110. For example, the system 110 may present a UK based consumer with different product selections than a US based consumer, even in light of a same or similar query input by both consumers.

The system 110 may provide the consumer with recommendations using different relational similarities. For example, the present technology may present the end user with highly relevant alternate items that are related to an item that the consumer has selected on the website. In other instances, the present technology may match consumers and products using any of the aforementioned preferences. Additionally, the system 110 may suggest or recommend products to consumers based upon selections made by other consumers with substantially similar preferences.

The system 110 may also contextually target products to a consumer based upon triggers, which are associated with rules. The application of these rules may affect the results of a search query or product listing requested by the consumer. Additionally, consumer segmentation may also be considered relative to the rules applied. In some instances, new rules, new consumer segmentation, and/or rule modification may occur based upon analysis of empirical consumer conversion data (e.g., how many consumers actually purchased an item that was directly targeted to the consumers).

Generally speaking, the system 110 may utilize a plurality of various types of triggers to effectuate the personalized delivery of data to the consumer. Triggers may be understood to comprise information or knowledge of any kind relative to a consumer, such as age, sex, language, race, and so forth. This information may be actionable and/or relatable to various types of rules that are utilized to influence products that are provided to the consumer (e.g., personalization) by the system 110. In some instances, marketers may establish rules that are based upon definable criteria such as customer segmentation and associated characteristics or attributes. Customers may be segmented or grouped together based upon any variety or permutation of attributes. For example, a consumer segment may comprise age ranges. In other examples, a consumer segment may include consumers fall within an age range and eat at a restaurant at least twice per week. As would be apparent to one of ordinary skill in the art, consumer segments may be constructed using an almost limitless number of facets. Additionally, consumer segmentation may be specifically tailored to the products and/or services provided by a merchant. Thus, a merchant in a niche market may utilize very specific customer segments.

When a consumer searches for, or browses an e-commerce website that employs the personalization/behavioral targeting technology provided herein, the system 110 may be executed to evaluate the preference information for the consumer. Again, preference information may be determined from objective and/or subjective knowledge of the consumer such as via web analytics, user profiles, questionnaires, contextual/behavioral/cultural data, user generated content, and many others. In other instances, consumer preferences may be pushed or uploaded to the system 110 from other marketers and/or merchants with which the consumer has interacted. When the consumer searches for a product, the system 110 may determine that certain preferences of the consumer match triggers that are associated with rules for the website. Again, these rules and triggers may revolve conceptually around established consumer segments that are relevant to the marketer and/or merchant. If the preferences of the consumer activate the triggers associated with at least one rule, the system 110 may apply the rule to the search results, which affect the display of the search results to provide the consumer with highly relevant search results.

By way of non-limiting example, assume that a consumer is a male (trigger one) between the ages of 18 and 25 (trigger two), and the system 110 determines that the consumer always purchases products that are on sale (trigger three). Moreover, a rule for this e-commerce site specifies that if these three triggers are met, the system 110 should personalize the search results to highly ranked items that are currently on sale. The ranking may also employ other additional known preferences for the consumer that may or may not implicate other triggers and/or rules.

According to some embodiments, the system 110 may be configured to provide raw search results in the event that personalization of a search result might cause latency that meets or exceeds a specified period of time, such as a latency threshold. For example, if the system 110 determines that it will take in excess of seven seconds to return the personalized and/or targeted search results, the system 110 may provide raw search results by default. Additionally, the system 110 may provide the personalized and/or targeted search results in a ribbon, pane, frame, and/or other section of the website when the personalized search results have finally been obtained. The personalized search results may be displayed around or proximate the raw search results.

In accordance with the present disclosure, the system 110 may provide products which are personalized and targeted without deleteriously affecting the performance (at least latency) of the e-commerce website.

Again, the system 110 may leverage triggers, customizable actions, attributes, and/or business rules within campaigns. Exemplary triggers may execute actions/campaigns such as "Almost Sold Out" and "You might also like" but the end result of these campaigns is the provision of highly relevant products to the consumer. Campaigns can be archived, deleted, validated, and so forth. Additionally, campaigns may be managed using an intuitive dashboard or graphical user interfaces.

The present technology may also enable images with hotspots that are coupled with triggers. According to some embodiments, the hotspots are not integral to the image file itself but may comprise templates that are associated with the image. Clicking these hotspots may activate a personalized marketing campaign, which may be tailored to the preferences of a consumer that clicked on the hotspot. As with campaigns, these hotspot-enhanced images may be archived, content (e.g. links, content, etc.) validated, and/or managed.

The triggers associated with hotspot enabled images or campaigns in general may be different from the triggers associated with the rule-based query process described above. That is, a trigger may be associated with an action or a predefined set of circumstances relative to a product. For example, a campaign such as "Almost Sold Out" may be displayed upon a trigger such as merchant having less than a specified amount of products left for sale. Thus, when a consumer views a product that is short on supply, the trigger is activated and an "Almost Sold Out" message may be displayed to the consumer.

As mentioned previously, the system 110 may match products to consumers via personalization techniques. For example, the system 110 may understand that a customer prefers "Silver®" brand jeans. Therefore, when a trigger is executed (such as clicking within hotspot enabled image file) a personalized search may be performed relative to a specified subject matter (e.g., jeans) and jeans manufactured by the consumer's favorite jeans manufacturer are ranked prominently to ensure that they are top of mind for the consumer. Likewise, consumers may rank brands or specify that they do not like certain brands. The system 110 may also dynamically match consumer selected products with additional complementary products to generate ensemble options that are appropriate for the personalized and selected product. For example, if a consumer selects a pair of jeans that correspond to the preferences of the consumer, the system may provide ensemble suggestions such as shirts, shoes, accessories, etc. that are complementary to the jeans. These suggestions may be rule-based (based upon common fashion guidelines and/or influenced by the subjective preferences of the consumer). In some instances the selected ensembles may be subject to crowdsourced reviews/opinions. The system 110 may also infer preferences of consumers based upon behavior and/or objective data such as demographics. For example, the system may infer that consumers under the age of 21 may prefer a certain brand of jeans.

Additionally, the system 110 may employ "e-merchandising" behaviors that affect product placement in online settings to encourage purchasing activities by consumers. The system 110 may employ "ranking cocktails" to encourage buying behavior. A ranking cocktail may include permutations of weighting of attributes such as inventory, margin, freshness, popularity, and so forth. A ranking cocktail may include permutations of any of these attributes, was well as a weight for each attribute. Selections of attributes and weights allow for marketers to execute various types of merchandising goals such as seasonal rankings, category specific rankings, and/or user-specific rankings. The present technology may also employ normalization, creation, editing, locking, of ranking cocktails.

Exemplary ranking cocktails may include seasonal cocktail rankings. One of ordinary skill in the art will appreciate that the focus of a merchant changes during the year: from the new spring collection, to Summer Sales, and Christmas. Using ranking cocktails seasonality can be reflected in product merchandising by selectively adjusting how items from query results are ranked. An exemplary Spring collection ranking cocktail may specify (35% freshness+40% margin+10% bestseller+10% top rated+5% inventory) to ensure that inventory selections are tailored to induce conversions of the latest and greatest products by consumers.

In another example, a ranking cocktail for Summer sales may specify (70% inventory+30% margin) to ensure that the greatest volume of products can be sold. Additionally, a Christmas sales ranking cocktail of (50% margin+30% popularity+20% inventory) may ensure a healthy profit relative to the end of year business.

According to some embodiments, ranking cocktails may comprise category-specific rankings, which may reflect that what matters to consumers may differ per category. Thus, the ranking cocktail that is selected may be based upon the determined preferences (e.g., subjective and objective data) of the consumer as has been described in greater detail above.

In electronics, for example, mainly freshness is important to consumers, whereas in fashion, popularity plays a big role. The system 110 may utilize different ranking cocktails for each of these situations. For example, an electronics ranking cocktail may specify (70% freshness+30% margin) to ensure the presentation of cutting edge products to the consumer. A fashion ranking cocktail may specify (50% popularity+50% margin) to ensure the presentation of really fashionable products to the consumer.

In other instances, ranking cocktails may comprise consumer-specific rankings, where different consumer segments prefer different products. For example, deal hunters, for instance, are mainly focused on cheap prices. In contrast, technophiles care about the latest gadgets and very little about cost. The present technology may utilize the following exemplary ranking cocktails, which have been tuned to consumer segments: Deal hunters: 70% price+30% margin ensures that the system 110 provides appropriately priced deals. Geeks: 70% freshness+30% margin ensures that the system 110 provides latest gadgets.

Other types of non-traditional sales characteristic may also be utilized, such as social recommendations, enterprise resource planning data, customer resource management data, and so forth. These types of data may be utilized in a consolidated item popularity ranking cocktail. For example, 30% Social Recommendations, 30% Web Analytics and 40% ERP.

Figure 2A:
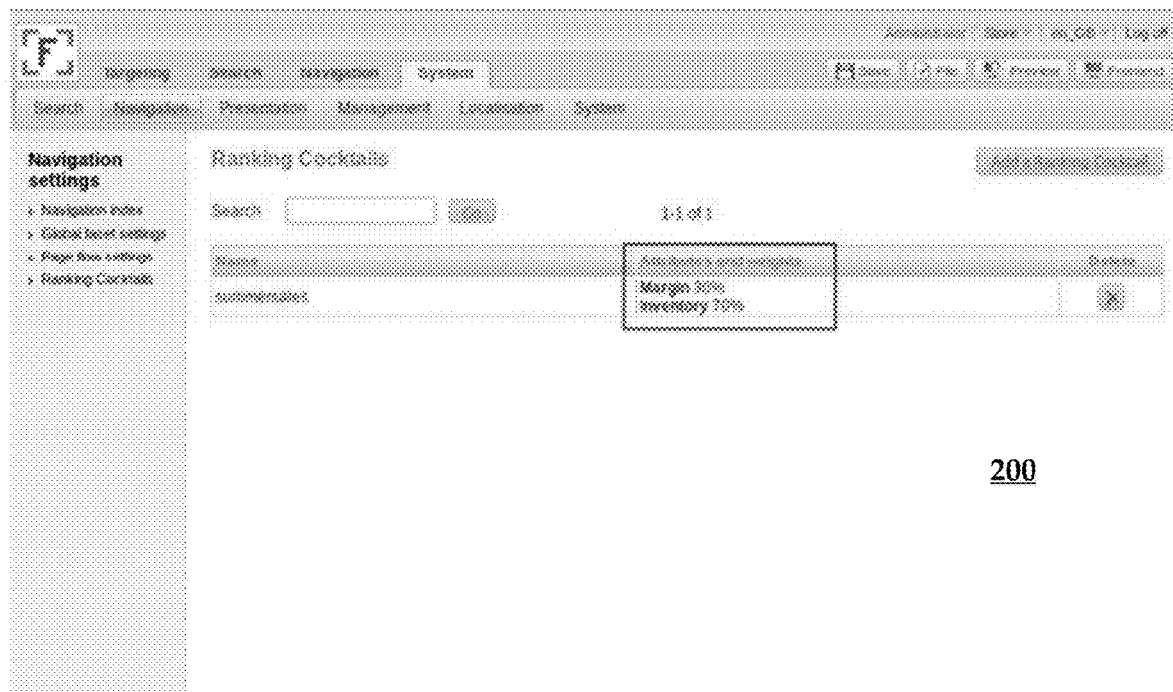
FIG. 2A is a graphical user interface illustrating the weighting of a ranking cocktail.
Figure 2B:
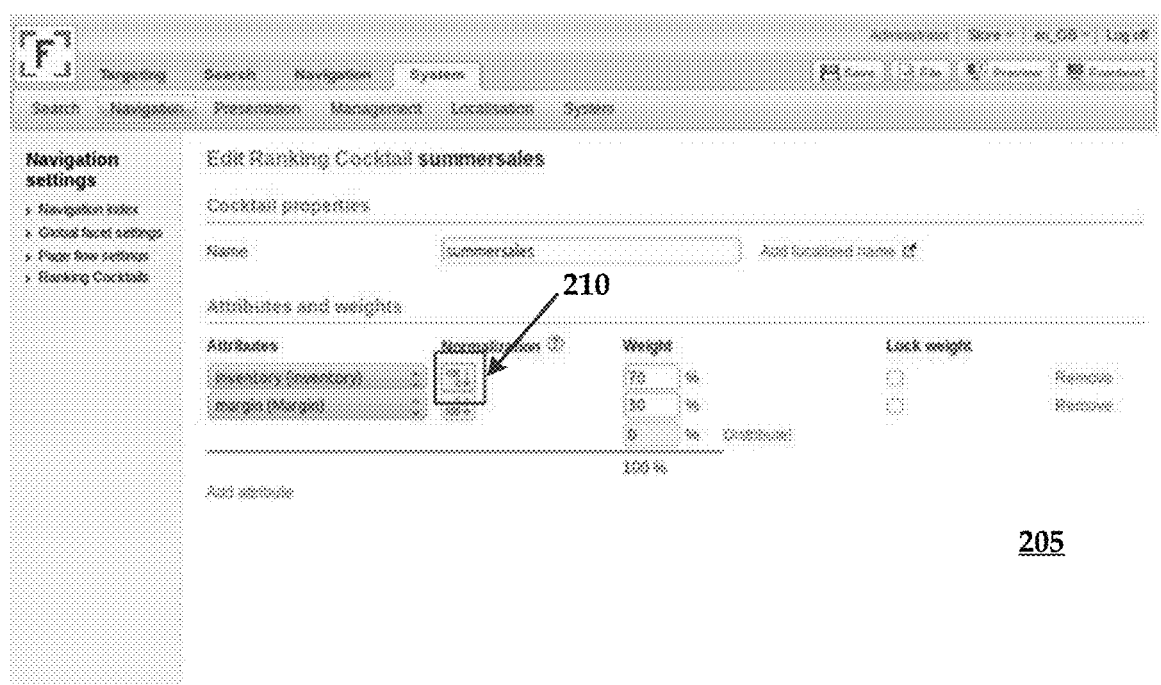
FIG. 2B is a graphical user interface illustrating the normalization of the ranking cocktail of FIG. 2A.

In some embodiments, the system 110 may allow the user to invert the normalization of an existing ranking cocktail. By default, normalization scales values of attribute types used in a ranking cocktail to the interval [0.0, 1.0] such that, the higher the attribute value, the higher the normalized value. That is, the normalization is monotonically increasing with respect to the value the item has for that attribute while inverted normalization is monotonically decreasing. For illustration purpose, assume an existing Summer Sales ranking cocktail includes 30% inventory+70% margin. Using normalization inversion, the user may select to invert the values of the cocktail such that the Summer Sales ranking cocktail includes 70% inventory+30% margin. FIGS. 2A and 2B illustrate graphical user interfaces 200 and 205 that are generated by the system 110. UI 200 illustrates an existing Summer Sales ranking cocktail that includes 30% inventory+70% margin weightings. When the normalization invert button 210 of the UI 205 of FIG. 2B is selected, the system 110 inverts the weighting of the Summer Sales ranking cocktail such that it includes 70% inventory+30% margin weightings.

In some embodiments, the system 110 may be configured to automatically distribute weight to non-weighted attributes of a ranking cocktail. For example, when a marketer utilizes the system 110 to generate a ranking cocktail, the user may select various attributes available to the marketer. In some instances, the attributes are made available using a drop-down list within a graphical user interface, such as the UIs 300 and 305 of FIGS. 3A and 3B, respectively.

In general, the system 110 is configured to receive a weight for at least one of the plurality of attributes, wherein some of the plurality of attributes are non-weighted. The UI 300 of FIG. 3A includes an inventory attribute that is non-weighted, meaning that the weighting value is zero. Since the margin attribute has been weighted at 30%, 70% of the weighting available remains unallocated. The user selects the distribute icon 310 of FIG. 3A to cause the system 110 to automatically allocate unallocated weight to both the margin and inventor attributes.

Figure 3A:
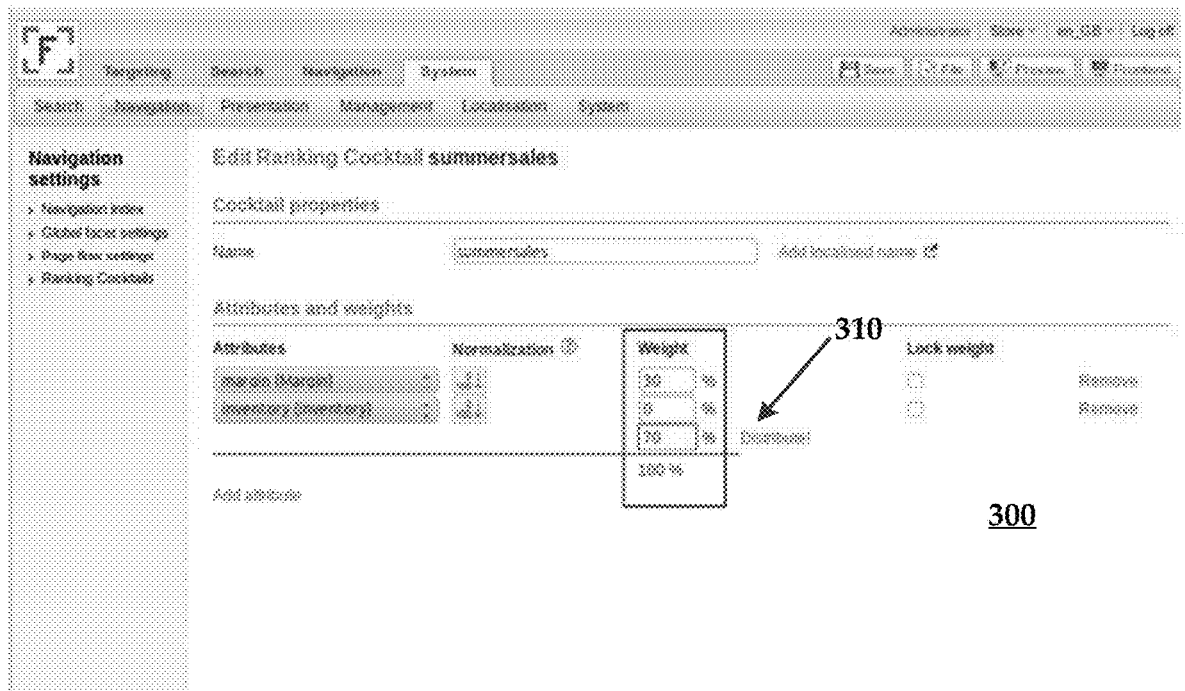
FIG. 3A is a graphical user interface illustrating the establishment of a ranking cocktail with non-weighted attributes.
Figure 3B:
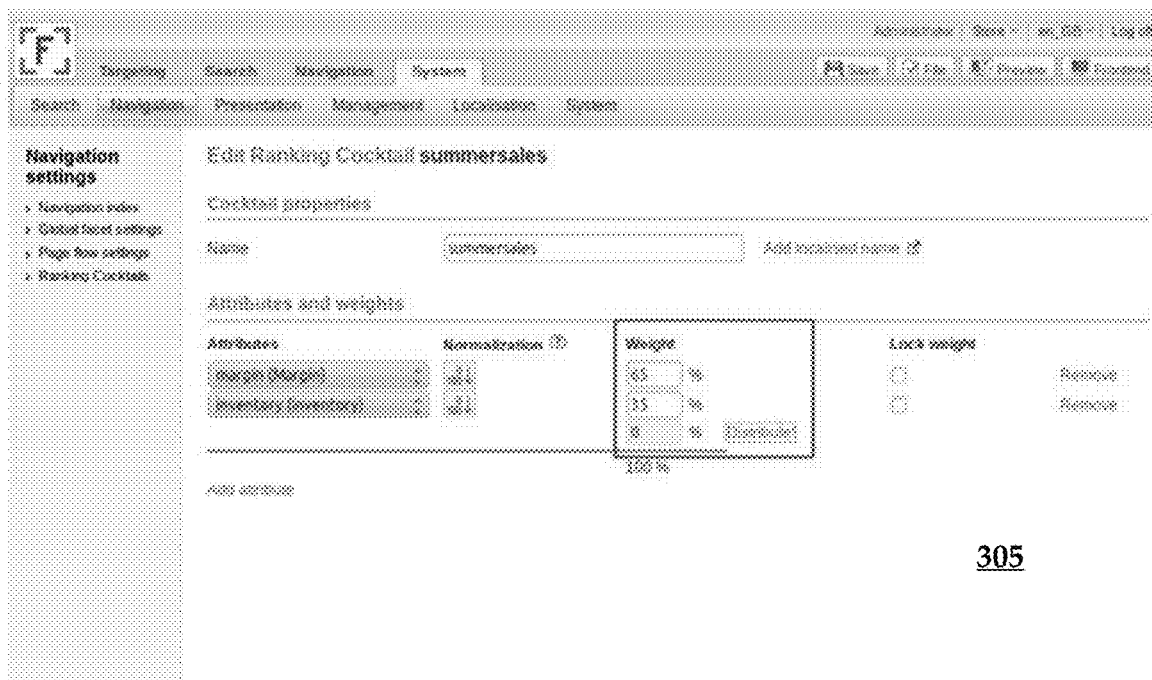
FIG. 3B is a graphical user interface illustrating the distribution of unallocated weight to non-weighted and previously weighted attributes.

In some embodiments, the system 110 may automatically distribute unallocated weight to only non-weighted attributes such that a total weight of the ranking cocktail equals 100%. For example, the system 110 may allocate the 70% unallocated weight only to non-weighted attributes, which in this instance includes only the inventory attribute. The system 110 may allow the user to "lock" an attribute to prevent additional allocations of weight to the locked attribute. FIGS. 3A and 3B both illustrate a lock check box with each attribute. Selection of this lock check box prevents changes to the weighting of the associated attribute.

In some instances, the system 110 may proportionally divide and distribute unallocated weight to each attribute, including any already-weighted attributes. If the user desires, the automatically distributed ranking cocktail may be stored in a database, such as the data store 125.

Figure 4:
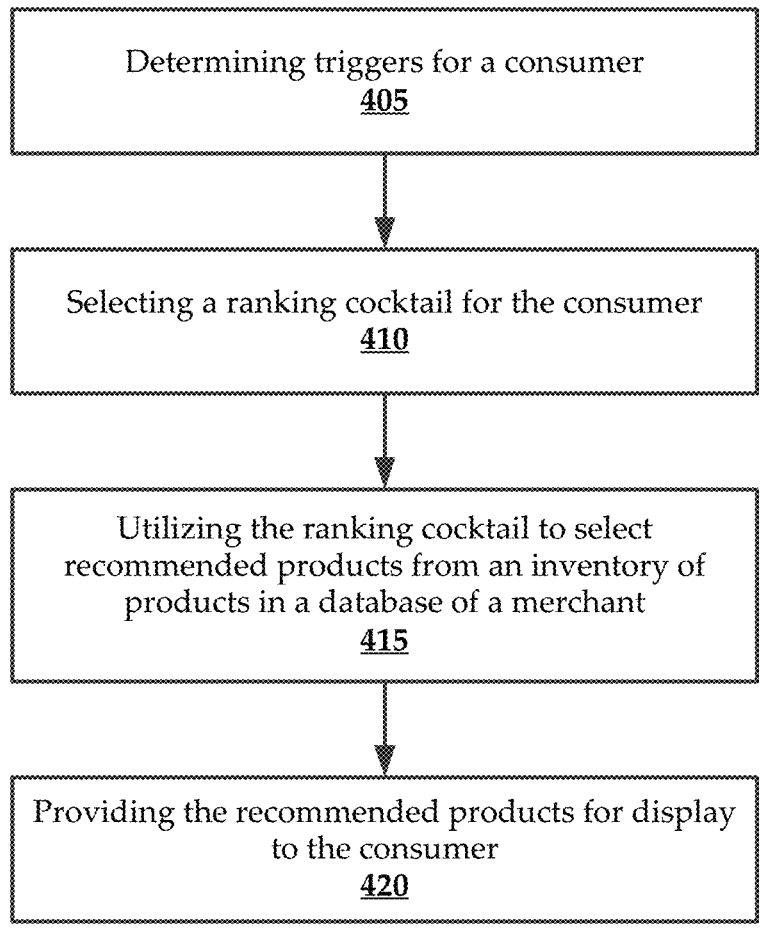
FIG. 4 is a flowchart of an exemplary method for providing recommended products to a consumer using a product recommendation and personalization system.

FIG. 4 is a flowchart of an exemplary method for providing recommended products to a consumer using a product recommendation and personalization system. The method may include determining 405 triggers for a consumer. As mentioned above, the triggers may be associated with objective consumer preferences and subjective consumer preferences for the consumer. Again, these preferences may be gather from a wide variety of information sources, including web analytic information gathered from the consumer as they utilize the website.

Next, the method may include selecting 410 a ranking cocktail for the consumer. The ranking cocktail includes a plurality of attributes that each comprise a weight, the ranking cocktail being selected based upon the triggers for the consumer. Using the examples provided previously, the system 110 may select, for example, Summer Sales, Deal Hunter, or any of the other ranking cocktails.

Next, the method includes applying 415 the ranking cocktail to select recommended products from an inventory of products in a database of a merchant. In some embodiments, applying may include calculating a ranking cocktail value for each of a plurality of products in the inventory of products, as well as ranking the plurality of products according to their ranking cocktail value. The process of applying may also include selecting at least a portion of highest ranked products according to the ranking. These selected products are thus personalized and targeted to the consumer.

Finally, the method also includes providing 420 the recommended products for display to the consumer. The step of providing may include displaying or presenting the selected products in a panel, ribbon, frame, list, or other representation in a manner that is consistent with the ranking cocktail. For example, if the ranking cocktail is "You may also like," the representation may include a frame with the header "You may also like."

Figure 5:
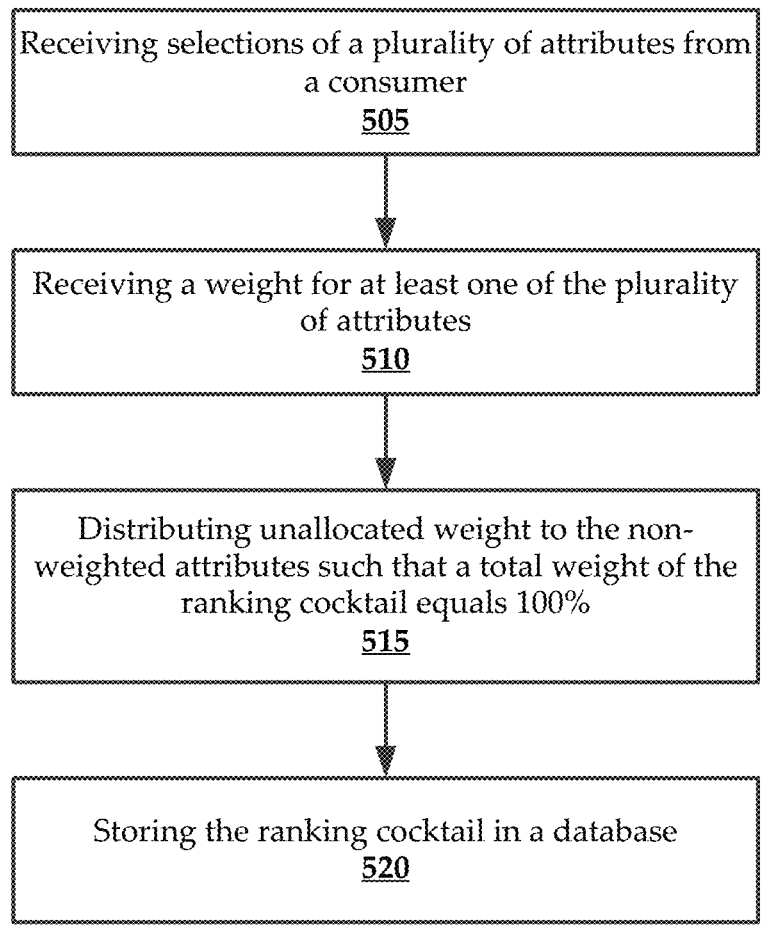
FIG. 5 is a flowchart of an exemplary method for generating a ranking cocktail for a product recommendation system.

FIG. 5 is a flowchart of an exemplary method for generating a ranking cocktail for a personalization system. The method may include receiving 505 selections of a plurality of attributes from a consumer. FIGS. 3A and 3B illustrate the selection of attributes for a ranking cocktail. Attributes may be selected from, for example, a dropdown list presented by the system 110 via a graphical user interface. In some embodiments, the method includes receiving 510 a weight for at least one of the plurality of attributes. It will be understood that some of the plurality of attributes are non-weighted.

The method then includes automatically distributing 515 unallocated weight to the non-weighted attributes such that a total weight of the ranking cocktail equals 100%. The system 110 may execute this step in response to a selection to distribute weights, received from an end user. Next, the method includes storing 520 the ranking cocktail in a database.

Figure 6:
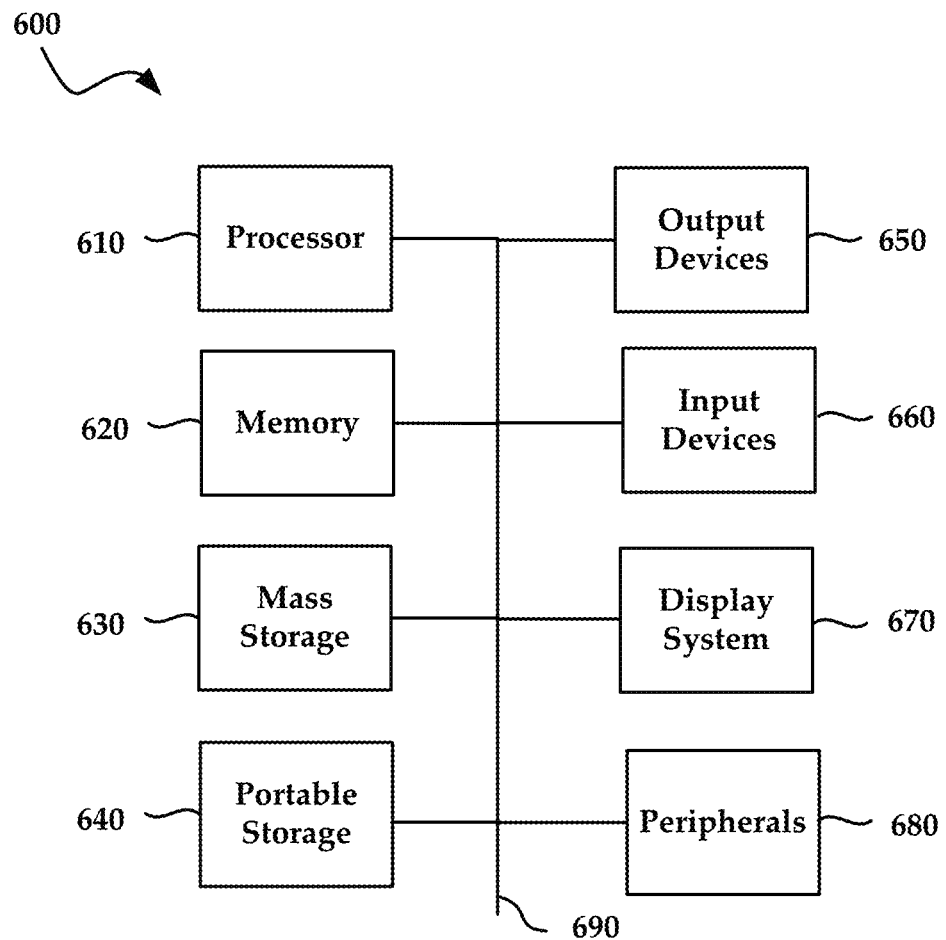
FIG. 6 is a block diagram of an exemplary computing system for implementing embodiments of the present technology.

FIG. 6 illustrates an exemplary computing system 600 (also referenced as system 600) that may be used to implement an embodiment of the present technology. The system 600 of FIG. 6 may be implemented in the contexts of the likes of computing systems, networks, servers, or combinations thereof. The computing system 600 of FIG. 6 includes a processor 610 and main memory 620. Main memory 620 stores, in part, instructions and data for execution by processor 610. Main memory 620 may store the executable code when in operation. The system 600 of FIG. 6 further includes a mass storage device 630, portable storage medium drive(s) 640, output devices 650, input devices 660, a graphics display 670, and peripheral device(s) 680.

The components shown in FIG. 6 are depicted as being connected via a single bus 690. The components may be connected through one or more data transport means. Processor 610 and main memory 620 may be connected via a local microprocessor bus, and the mass storage device 630, peripheral device(s) 680, portable storage medium drive(s) 640, and graphics display 670 may be connected via one or more input/output (I/O) buses.

Mass storage device 630, which may be implemented with a magnetic disk drive or an optical disk drive, is a non-volatile storage device for storing data and instructions for use by processor 610. Mass storage device 630 may store the system software for implementing embodiments of the present invention for purposes of loading that software into main memory 620.

Portable storage medium drive(s) 640 operates in conjunction with a portable non-volatile storage medium, such as a floppy disk, compact disk, digital video disc, or USB storage device, to input and output data and code to and from the computing system 600 of FIG. 6. The system software for implementing embodiments of the present invention may be stored on such a portable medium and input to the computing system 600 via the portable storage medium drive(s) 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Suitable output devices include speakers, printers, network interfaces, and monitors.

Graphics display 670 may include a liquid crystal display (LCD) or other suitable display device. Graphics display 670 receives textual and graphical information, and processes the information for output to the display device.

Peripheral device(s) 680 may include any type of computer support device to add additional functionality to the computing system. Peripheral device(s) 680 may include a modem or a router.

The components provided in the computing system 600 of FIG. 6 are those typically found in computing systems that may be suitable for use with embodiments of the present invention and are intended to represent a broad category of such computer components that are well known in the art. Thus, the computing system 600 of FIG. 6 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for generating a ranking cocktail for a product recommendation system, the method comprising:
   receiving selections of a plurality of attributes from a consumer;
   calculating a weight for at least one of the plurality of attributes, wherein some of the plurality of attributes are non-weighted, the weighting based on the selections;
   determining, by a computing device, that applying the ranking cocktail to a query to obtain recommended products would cause a latency that meets or exceeds a specified latency threshold;
   based on the determination that applying the ranking cocktail to the query to obtain recommended products would cause a latency that meets or exceeds a specified latency threshold, returning, by the computing device, raw product results in response to the query;
   automatically distributing unallocated weight to the non-weighted attributes such that a total weight of the ranking cocktail equals 100%; and
   storing the ranking cocktail in a database.

2. The method according to claim 1, further comprising selecting recommended products from a database using the ranking cocktail, the ranking cocktail allowing for the recommended products to be selected based on preferences of the consumer, the preferences comprising both objective and subjective preferences.

3. The method according to claim 1, further comprising normalizing the plurality of attributes to scale the weight of each of the plurality attributes in such a way that higher weighted attributes have higher weighted normalized values.

4. The method according to claim 3, wherein normalizing comprises any of monotonically increasing and monotonically decreasing the weight of each of the plurality attributes.

5. The method according to claim 2, further comprising:
presenting the recommended products for display on a website that have been selected using the ranking cocktail;
receiving crowdsource feedback on the recommended products; and
adjusting the weighting of at least one attribute of the ranking cocktail in response to the crowdsource feedback to alter the selection of recommended products from an inventory of products.

6. The method according to claim 1, further comprising: selecting, by the computing device, recommended products from an inventory of products in a database of a merchant using the ranking cocktail.

7. The method according to claim 1, further comprising providing, by the computing device, the recommended products for display to the consumer when the latency does not meet or exceed the specified latency threshold after the raw product results are returned.

8. The method according to claim 1, wherein the ranking cocktail comprises any of a seasonal ranking cocktail, a category-specific ranking cocktail, a consumer-specific ranking cocktail, a deal hunter ranking cocktail, and a geek ranking cocktail.

9. The method according to claim 1, wherein the ranking cocktail comprises a social recommendation ranking cocktail that includes a social recommendation attribute, a web analytics attribute, and an enterprise resource planning (ERP) attribute.

10. A method for generating a ranking cocktail for a product recommendation system, the method comprising:
determining objective and subjective preferences of a consumer;
generating the ranking cocktail by:
calculating a weight for a portion of a plurality of attributes, wherein the attributes are based on the objective and subjective preferences of the consumer, wherein each weight is normalized; and
applying the ranking cocktail to select recommended products to display to the consumer;
determining, by a computing device, that applying the ranking cocktail to a query to obtain recommended products would cause a latency that meets or exceeds a specified latency threshold;
based on the determination that applying the ranking cocktail to the query to obtain recommended products would cause a latency that meets or exceeds a specified latency threshold, returning, by the computing device, raw product results in response to the query; and
automatically distributing unallocated weight to non-weighted attributes such that a total weight of the ranking cocktail equals 100%.

11. The method according to claim 10, further comprising inverting a normalization of the ranking cocktail.

12. The method according to claim 11, wherein the normalization is monotonically increasing with respect to a value a recommended product has for that attribute while inverted normalization is monotonically decreasing.

13. The method according to claim 10, further comprising proportionally dividing and distributing the unallocated weight to each attribute.

14. A method for generating a ranking cocktail for a product recommendation system, the method comprising:
determining objective and subjective preferences of a consumer;
segmenting the consumer according to their objective and subjective preferences;
selecting the ranking cocktail for a segment to which the consumer belongs, wherein the ranking cocktail comprises weightings for a portion of a plurality of attributes, wherein the attributes are based on the objective and subjective preferences of the consumer and based on the segment of the consumer;
determining that one or more triggers have been met based on actions performed by the consumer;
applying the ranking cocktail to select recommended products to display to the consumer;
determining, by a computing device, that applying the ranking cocktail to a query to obtain recommended products would cause a latency that meets or exceeds a specified latency threshold;
based on the determination that applying the ranking cocktail to the query to obtain recommended products would cause a latency that meets or exceeds a specified latency threshold, returning, by the computing device, raw product results in response to the query; and
selecting one or more complementary products based on the recommended products selected for the consumer.

15. The method according to claim 14, further comprising receiving crowdsourced feedback on the recommended products, the one or more complementary products and combinations thereof.

16. The method according to claim 14, wherein the objective preferences comprise behaviors selected from any of websites visited, click through data, average time spent on a webpage, search histories, shopping cart items, past purchasing data, buying preferences, buying patterns, and any combinations thereof.

17. The method according to claim 14, wherein the selection of the recommended products is further based on upon product selections made by other consumers with substantially similar preferences to that of the consumer.

18. The method according to claim 14, wherein the objective and subjective preferences comprise demographic information of the consumer, psychographic information of the consumer, as well as subjective preferences which comprise favorite brand of the consumer, favorite designer of the consumer, favorite color of the consumer, and any combinations thereof.

* * * * *